United States Patent
Guerra

(10) Patent No.: US 11,059,839 B2
(45) Date of Patent: Jul. 13, 2021

(54) FUNCTIONAL FLUORINATED SILANE COMPOUNDS

(71) Applicant: 3M INNOVATIVE PROPERTIES COMPANY, St. Paul, MN (US)

(72) Inventor: Miguel A. Guerra, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 16/957,942

(22) PCT Filed: Dec. 20, 2018

(86) PCT No.: PCT/US2018/066681
§ 371 (c)(1),
(2) Date: Jun. 25, 2020

(87) PCT Pub. No.: WO2019/133414
PCT Pub. Date: Jul. 4, 2019

(65) Prior Publication Data
US 2021/0163511 A1 Jun. 3, 2021

Related U.S. Application Data

(60) Provisional application No. 62/611,122, filed on Dec. 28, 2017.

(51) Int. Cl.
*C07F 7/18* (2006.01)
*C07F 7/12* (2006.01)
*C08G 77/20* (2006.01)

(52) U.S. Cl.
CPC .............. *C07F 7/1804* (2013.01); *C07F 7/12* (2013.01); *C08G 77/20* (2013.01)

(58) Field of Classification Search
CPC ...... C07F 7/12; C07F 7/18; C08K 3/34; C08K 5/54; C08K 5/5406
See application file for complete search history.

(56) References Cited

U.S. PATENT DOCUMENTS

| | | |
|---|---|---|
| 5,958,822 A | 9/1999 | Beckerbauer |
| 7,307,113 B2 | 12/2007 | Yang |
| 8,445,551 B2 | 5/2013 | Obara |
| 2009/0118429 A1* | 5/2009 | Sugiyama ............ C08F 259/08 525/199 |

FOREIGN PATENT DOCUMENTS

| | | |
|---|---|---|
| EP | 2028200 | 2/2009 |
| WO | WO 2003-057702 | 7/2003 |
| WO | WO 2014-200973 | 12/2014 |

OTHER PUBLICATIONS

Bevan, "Polyfluoroalkyl Compounds of Silicon. Part XII, Reactions of Trichlorosilane With 2-Chloro- and 2-Bromo-1, 1-Difluoroethylene", Journal of the Chemical Society, Dalton Transactions: Inorganic Chemistry, 1974, vol. 21, pp. 2305-2309.
Omotowa, "Reactions of Iodoperfluoro-3-oxaundecylsulfonyl Fluoride with Halohydrocarbons through Organometallic Intermediates", Inorganic Chemistry, 1999, vol. 38, No. 26, pp. 6055-6059.
International Search Report for PCT International Application No. PCT/US2018/066681, dated Mar. 29, 2019, 4 pages.

* cited by examiner

*Primary Examiner* — Kuo Liang Peng
(74) *Attorney, Agent, or Firm* — Thomas M Spielbauer

(57) ABSTRACT

A compound according to formula I: X—$(CF_2)_n$-$(O)_p(CH_2)$m-Si—$Y_3$ wherein X is $CF_2$=CF—O—, $CH_2$=$CHCH_2$—O—, or $CH_2$=$CHCH_2$—; n is an integer from 2 to 8; m is an integer from 2 to 5; p is 0 or 1; and Y is Cl— or —OR, where R is a linear or branched alkyl having 1 to 4 carbon atoms. In some embodiments, Y is —$O(CH_2)xCH_3$, where x is an integer from 0 to 3.

19 Claims, No Drawings

FUNCTIONAL FLUORINATED SILANE COMPOUNDS

CROSS REFERENCE TO RELATED APPLICATIONS

This application is a national stage filing under 35 U.S.C. 371 of PCT/US2018/066681, filed Dec. 20, 2018, which claims the benefit of Provisional Application No. 62/611,122, filed Dec. 28, 2017, the disclosure of which is incorporated by reference in their entirety herein.

TECHNICAL FIELD

The present disclosure relates to silane compounds that include functional groups that can be useful for polymerization, chain transfer, or as a curative agent.

SUMMARY

A compound according to formula I:

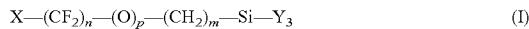

$$X-(CF_2)_n-(O)_p-(CH_2)_m-Si-Y_3 \quad (I)$$

wherein X is $CF_2=CF-O-$, $CH_2=CHCH_2-O-$, or $CH_2=CHCH_2-$; n is an integer from 2 to 8; m is an integer from 2 to 5; p is 0 or 1; and Y is Cl— or —OR, where R is a linear or branched alkyl having 1 to 4 carbon atoms. In some embodiments, Y is $-O(CH_2)_xCH_3$, where x is an integer from 0 to 3.

The above summary is not intended to describe each embodiment of the present disclosure. The details of one or more embodiments of the present disclosure are also set forth in the description below. Other features, objects, and advantages of the present disclosure will be apparent from the description and from the claims.

DETAILED DESCRIPTION

Fluorochemicals having a functional group can be useful as intermediates in a wide variety of applications. Their usefulness may be due to properties they can impart, including for example thermal resistance, chemical resistance, or both; oleophobicity, hydrophobicity, or both; or combinations thereof.

Silanes can be useful as crosslinking agents to crosslink polymers thereby improving tear resistance, elongation at break, abrasion resistance, or combinations thereof. Silane coupling agents bind to minerals or silica type fillers resulting in improvements in mixing, bonding of fillers to polymers, matrix strength, or combinations thereof. Silanes can also adhere fibers such as glass fibers, carbon fibers, or both to certain polymers to make the matrix compatible. Additional applications include water repellency, usefulness in adhesives to repel water, masonry protection, graffiti control and as sealants.

Disclosed herein are compounds including a silane group, a fluorinated group and a functional group. The silane group and the fluorinated group provide advantageous properties and the functional group provides chemical functionality to disclosed compounds. For example, the functional group can be chosen such that the compound can function as a chain-transfer agent, the compound can function as a curative, or some combination thereof.

In some embodiments, one method of making such disclosed compounds includes bonding a compound having a functional end with fluorinated carbons followed by an alkene on the opposite end that has been hydrosilylated with trichlorosilane using a platinum catalyst. This synthetic method is illustrated by the generic Scheme 1 below.

Scheme 1

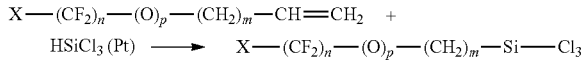

$$X-(CF_2)_n-(O)_p-(CH_2)_m-CH=CH_2 +$$
$$HSiCl_3 (Pt) \longrightarrow X-(CF_2)_n-(O)_p-(CH_2)_m-Si-Cl_3$$

In Scheme 1, X can be selected from $CF_2=CF-O-$, $CH_2=CHCH_2-O-$, or $CH_2=CHCH_2-$; n can be an integer from 2 to 8; m can be an integer from 2 to 5; p is 0 or 1; and Y is Cl— or —OR, where R is a linear or branched alkyl having 1 to 4 carbon atoms. In some embodiments, Y is $-O(CH_2)_xCH_3$, where x is an integer from 0 to 3. Scheme 2 presents a more specific illustration of this particular synthetic method, wherein p=0.

Scheme 2

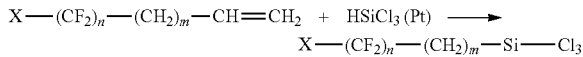

$$X-(CF_2)_n-(CH_2)_m-CH=CH_2 + HSiCl_3 (Pt) \longrightarrow$$
$$X-(CF_2)_n-(CH_2)_m-Si-Cl_3$$

In some methods, the trichlorosilane compounds can be reacted with an alcohol to produce easier to handle trialkoxy silanes. This synthetic method is illustrated by the generic Scheme 3 below using a linear alcohol as an exemplary alcohol.

Scheme 3

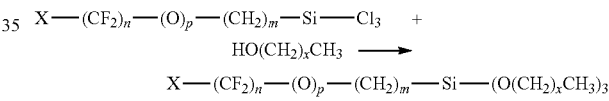

$$X-(CF_2)_n-(O)_p-(CH_2)_m-Si-Cl_3 +$$
$$HO(CH_2)_xCH_3 \longrightarrow$$
$$X-(CF_2)_n-(O)_p-(CH_2)_m-Si-(O(CH_2)_xCH_3)_3$$

In Scheme 3, X, m, n, and p are as defined above. Scheme 4 presents a more specific illustration of this particular synthetic method, wherein p=0.

Scheme 4

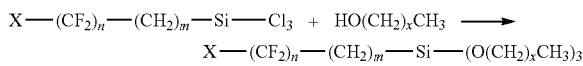

$$X-(CF_2)_n-(CH_2)_m-Si-Cl_3 + HO(CH_2)_xCH_3 \longrightarrow$$
$$X-(CF_2)_n-(CH_2)_m-Si-(O(CH_2)_xCH_3)_3$$

Disclosed compounds include those of formula I below.

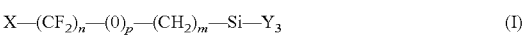

$$X-(CF_2)_n-(O)_p-(CH_2)_m-Si-Y_3 \quad (I)$$

X can be selected from $CF_2=CF-O-$, $CH_2=CHCH_2-O-$, or $CH_2=CHCH_2-$; n can be an integer from 2 to 8; m can be an integer from 2 to 5; p is 0 or 1; and Y can be Cl— or —OR, where R is a linear or branched alkyl having 1 to 4 carbon atoms. In some embodiments, Y is $-O(CH_2)_xCH_3$, where x is an integer from 0 to 3. In some embodiments, n can be an integer from 2 to 7, from 2 to 6 or even from 2 to 4. In some embodiments, m can be an integer from 2 to 4 or from 2 to 3. In some embodiments, Y can be $-O(CH_2)_xCH_3$ where x is 0, i.e., where Y is $-OCH_3$.

Illustrative specific compounds disclosed herein include:

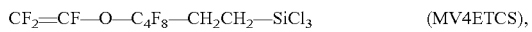

$$CF_2=CF-O-C_4F_8-CH_2CH_2-SiCl_3 \quad (MV4ETCS),$$

$CF_2$=CF—O—$C_4F_8$—$CH_2CH_2$—Si($OCH_3$)$_3$ (MV4ETMS), $CF_2$=CF—O—$C_4F_8$—$CH_2CH_2CH_2$—$SiCl_3$ (MV4PTCS), $CF_2$=CF—O—$C_4F_8$—$CH_2CH_2CH_2$—Si($OCH_3$)$_3$ (MV4PTMS), $CH_2$=CH$CH_2C_4F_8CH_2CH_2CH_2SiCl_3$ (AC4PTCS), $CH_2$=CH$CH_2C_4F_8CH_2CH_2CH_2$Si($OCH_3$)$_3$ (AC4PTM), $CH_2$=CH$CH_2$—O—$C_4F_8$O—$CH_2CH_2CH_2SiCl_3$(AEC4EPTCS), and $CH_2$=CH$CH_2$—O—$C_4F_8$—O—$CH_2CH_2CH_2$Si($OCH_3$)$_3$ (AEC4EPTMS).

Other exemplary compounds include trialkoxy silane analogues of such trimethoxy silanes, e.g., triethoxy silanes.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open-ended sense, and generally mean "including, but not limited to". It will be understood that "consisting essentially of", "consisting of", and the like are subsumed in "comprising" and the like. For example, a composition that "comprises" silver may be a composition that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects is present. For example, a "second" substrate is merely intended to differentiate from another substrate (such as a "first" substrate). Use of "first," "second," etc. in the description above and the claims that follow is also not necessarily intended to indicate that one comes earlier in time than the other.

While particular implementations of functional fluorinated silane compounds are described herein, other configurations and embodiments consistent with and within the scope of the present disclosure will be apparent to one of skill in the art upon reading the present disclosure. Various modifications and alterations of the present disclosure will become apparent to those skilled in the art without departing from the scope and spirit of this invention.

EXAMPLES

Objects and advantages may be further illustrated by the following examples, but the particular materials and amounts thereof recited in these examples, as well as other conditions and details, should not be construed to unduly limit this disclosure.

All materials are commercially available, for example from Sigma-Aldrich Chemical Company, Milwaukee, Wis., USA, or known to those skilled in the art, unless otherwise stated or apparent. Unless otherwise noted, all parts, percentages, ratios, etc. in the examples and the rest of the specification are by weight. The following abbreviations are used in this section: mL=milliliters, g=grams, lb=pounds, mm=millimeters, wt %=percent by weight, min=minutes, h=hours, NMR=nuclear magnetic resonance, ppm=parts per million, phr=parts per hundred rubber; ° C.=degrees Celsius, dNm=deci-newton-meter, mmHg=millimeters of mercury, kPa=kilopascal, mol=moles, psig=pounds per square inch gauge Abbreviations for materials used in this section, as well as descriptions of the materials, are provided in Table 1.

TABLE 1

| Material | Details |
|---|---|
| I$C_4F_8$I | 1,4-Diiodoperfluorobutane, available from Tosoh, Grove City, OH, USA |
| Sodium methoxide | 25 wt % solution in methanol, available from Sigma Aldrich |
| Allyl acetate | Available from Alfa Aesar, Ward Hill, MA, USA |
| t-Butylperoxy-2-ethylhexanoate | Available from United Initiators, Elyria, OH, USA |
| t-amylperoxy-2-ethylhexanoate | Available from United Initiators |
| Ethylene | Available from Sigma Aldrich |
| Methanol | Available from Sigma Aldrich |
| KF | Available from Sigma Aldrich |
| Tetra-n-butylammonium bromide | Available from Alfa Aesar |
| Allyl bromide | Available from TCI America, Portland, OR, USA |
| Diglyme | Available from Sigma Aldrich |
| Perfluorosuccinyl fluoride | Available from Exfluor Research Corp, Austin, TX, USA |
| Zinc Powder | Available from Sigma Aldrich |
| Bromine | Available from Sigma Aldrich |
| Trichlorosilane | Available from Sigma Aldrich |
| Platinum divinyl tetramethyl disiloxane complex | 2.2% Pt solution in xylene, available from Gelest |

Example 1. Preparation of $CF_2$=CF—O—$C_4F_8$—$CH_2CH_2$—$SiCl_3$, MV4ETCS

To a 40 ml heavy wall glass ampoule having a threaded top containing a magnetic stir bar was charged with 12 g, 0.04 mol of $CF_2$=CF—O—$C_4F_8$—CH=$CH_2$ described in WO2014200973 as MV4E and 5.4 g, 0.04 mol of $HSiCl_3$ available from Aldrich. The mixture was stirred and 100 uL of a 2.4 weight % Pt as platinum-divinyltetramethyl disiloxane complex available from Gelest, Inc. was added. The glass ampoule was sealed by a glass tube inserted into the top by a threaded plastic cap and O-ring. The reaction was run at 100° C. for 20 hours. Vacuum distillation isolated 8.8 g, 0.02 mol of $CF_2=CF-O-C_4F_8-CH_2CH_2-SiCl_3$ boiling of 60° C. at 3 mm for a 52% yield. NMR confirmed the compound.

Example 2. Preparation of $CF_2=CF-O-C_4F_8-CH_2CH_2-Si(OCH_3)_3$, MV4ETMS

To a 250 ml 3-neck round bottom flask containing a magnetic stir bar, thermocouple and condenser was charged with 5 g excess methanol available from Aldrich. The methanol was stirred and 7 g, 0.013 mol of compound from example 1 was added drop wise. The reaction was stirred at 25° C. for 15 minutes and vacuum distillation isolated 5.4 g, 0.012 mol of $CF_2=CF-O-C_4F_8-CH_2CH_2-Si(OCH_3)_3$ boiling of 52° C. at 2 mm for an 83% yield. $^{19}FNMR$ negative upfield of internal $CFCl_3$, $^1HNMR$ ppm downfield of internal TMS and $^{29}SiNMR$ negative ppm upfield of internal TMS in $CDCl_3$.

$CF^aF^b=CF^c-O-CF_2{}^dCF_2{}^eCF_2{}^fCF_2{}^g-CH_2{}^hCH_2{}^i-Si^j(OCH_3{}^k)_3$, (a) −122.4 d/d/t (112.3 Hz d, 85.2 Hz d, 5.9 Hz t), (b) −114.5 d/d (85.2 Hz d, 65.8 Hz d), (c) −135.5 d/d/t (112.3 Hz d, 65.8 Hz d, 5.8 Hz t), (d) −85.4 m (5.8 Hz m), (e) −125.4 m, (f) −124.0 m. (g) −117.2 m, (h) 2.18 m, (i) 0.87 m, (k) 3.61 s, (j) −44.2.

Example 3. Preparation of $CF_2=CF-O-C_4F_8-CH_2CH_2CH_2-SiCl_3$, MV4PTCS

The compound $CF_2=CF-O-C_4F_8-CH_2CH=CH_2$ was made as described in WO2014200973 as $ClCF_2CFCl-O-C_4F_8-SO_2Na$ and reacted first by addition of 375 g, 0.82 mol into a 3 L 3-neck round bottom equipped with a mechanical stirrer, thermocouple and condenser and containing 1 L dimethylformamide, 150 g, 1.24 mol allyl bromide and 220 g, 0.92 mol of sodium peroxydisulfate all available from Alfa Aesar. The stirred mixture was heated to 45° C. and addition of the dichloride over one hour the temperature reached 115° C. The mixture was cooled to 25° C. and washed three times with 500 g of distilled water. Vacuum distillation gave 180 g of $ClCF_2CFCl-O-C_4F_8-CH_2CH=CH_2$ boiling at 70-82° C. at 5 mm for a 53% yield. Dechlorinated was done in a 1 L 3-neck round bottom flask equipped with a mechanical stirrer, thermocouple and condenser and containing 300 ml dimethylformamide, 58 g, 0.88 mol zinc powder and 0.1 g bromine all available from Alfa Aesar. The mixture was stirred and heated to 95° C. and 180 g, 0.44 mol $ClCF_2CFCl-O-C_4F_8-CH_2CH=CH_2$ was added over one hour with the temperature reaching 114° C. The product and dimethylformamide was atmospherically codistilled cooled to 25° C. and water washed twice with 500 g of distilled water. Distillation gave 87 g $CF_2=CF-O-C_4F_8-CH_2CH=CH_2$ boiling at 128° C. for a 59% yield. To a 40 ml heavy wall glass ampoule having a threaded top containing a magnetic stir bar was charged with 12 g, 0.036 mol of $CF_2=CF-O-C_4F_8-CH_2CH=CH_2$ and 5.4 g, 0.04 mol of $HSiCl_3$ available from Aldrich. The mixture was stirred and 100 uL of a 2.4 weight % Pt as platinum-divinyltetramethyl disiloxane complex available from Gelest, Inc. was added. The glass ampoule was sealed by a glass tube inserted into the top by a threaded plastic cap and O-ring. The reaction was run at 130° C. for 20 hours. Vacuum distillation isolated 11.5 g, 0.024 mol of $CF_2=CF-O-C_4F_8-CH_2CH_2CH_2-SiCl_3$ boiling of 74° C. at 3 mm for a 68% yield. $^{19}FNMR$ negative upfield of internal $CFCl_3$, $^1F$ NMR ppm downfield of internal TMS and $^{29}SiNMR$ negative ppm upfield of internal TMS in $CDCl_3$.

$CF^aF^b=CF^cOCF2^dCF2^eCF2^fCF2^gCH2^hCH2^iCH2^jSi^kCl_3$, (a) −122.3 d/d/t (112 Hz d, 84.7 Hz d, 5.8 Hz t), (b) −114.2 d/d (84.7 Hz d, 66.0 Hz d), (c) −135.5 d/d/t (112 Hz d, 66.0 Hz d, 6.1 Hz t), (d) −85.5 m, (e) −125.5 m, (f) −124.3 m, (g) −115.0 m, (h) 2.18 t/t (17.9 Hz t, 8.0 Hz t), (i) 1.94 m (8.0 Hz m), (j) 1.49 m, (k) −11.5.

Example 4. Preparation of $CF_2=CF-O-C_4F_8-CH_2CH_2CH_2-Si(OCH_3)_3$, MV4PTMS

To a 250 ml 3-neck round bottom flask containing a magnetic stir bar, thermocouple and condenser was charged with 11 g excess methanol available from Aldrich. The methanol was stirred and 22 g, 0.046 mol of compound from example 3 was added drop wise. The reaction was stirred at 25° C. for 15 minutes and vacuum distillation isolated 19 g, 0.04 mol of $CF_2=CF-O-C_4F_8-CH_2CH_2CH_2-Si(OCH_3)_3$ boiling of 83° C. at 2 mm for an 90% yield. NMR confirmed the compound.

Example 5. Preparation of $CH_2=CHCH_2C_4F_8CH_2CH_2CH_2SiCl_3$, AC4PTCS

To a 1 L, 3-neck round bottom flask equipped with a mechanical stirrer, thermocouple and condenser was charged 454 g (1.0 mol) of $IC_4F_8I$, 300 g (3.0 mol) of allyl acetate and 4 g (0.018 mol) of t-butylperoxy-2-ethylhexanoate. The mixture was stirred and heated to 75° C. for 20 h. The red-brown solution was vacuum stripped to remove starting allyl acetate and added dropwise to a 1 L, 3-neck round bottom flask equipped with a mechanical stirrer, thermocouple and condenser that was charged with 125 g (1.9 mol) of zinc powder, 400 g methanol that was activated with 10 g (0.06 mol) of bromine. The mixture was allowed to reflux at 65° C. for 1 h and distilled over into a receiver containing water to isolate 105 g (0.37 mol) of diallyl octafluorobutane. To a 250 mL, round bottom flask equipped with a mechanical stirrer, thermocouple and condenser was charged 105 g (0.37 mol) of diallyl octafluorobutane, 20 g (0.15 mol) of trichlorosilane and 300 ppm platinum divinyl tetramethyl disiloxane complex stirred and heated to 60° C. for 4 h. The solution was vacuum stripped to first remove excess diallyl octafluorobutane, isolating 78 g (0.19 mol) of $CH_2=CHCH_2C_4F_8CH_2CH_2CH_2SiCl_3$ having a boiling point of 66° C. at 5 Torr for a 73% yield. NMR confirmed the compound.

Example 6. Preparation of $CH_2=CHCH_2C_4F_8CH_2CH_2CH_2Si(OCH_3)_3$, AC4PTMS

To a 250 mL 3-neck, round bottom flask containing a magnetic stir bar, thermocouple and condenser was charged 25 g methanol. The methanol was stirred and 45 g (0.11 mol) of compound from example 5 was added dropwise. The reaction was stirred at 30° C. for 15 min and vacuum distillation isolated 38 g (0.09 mol) of $CH_2=CHCH_2C_4F_8CH_2CH_2CH_2Si(OCH_3)_3$ having a boiling point of 95° C. at 2 Torr for an 87% yield. NMR confirmed the compound. $^{19}FNMR$ negative upfield of internal $CFCl_3$, $^1HNMR$ ppm downfield of internal TMS and $^{29}SiNMR$ negative ppm upfield of internal TMS in $CDCl_3$.

CH$^a$H$^b$═CH$^c$CH$_2$$^d$CF$_2$$^e$CF$_2$$^f$CF$_2$$^g$CF$_2$$^h$CH$_2$$^i$CH$_2$$^j$CH$_2$$^k$Si$^l$(OCH$_3$$^m$)$_3$, (a) 5.31 d/d (8.3 Hz d, 1.2 Hz d), (b) 5.30 d/d (9.3 Hz d, 1.2 Hz d), (c) 5.81 d/d/t (18.3 Hz d, 9.3 Hz d, 7.0 Hz t), (d) 2.83 t/d, (e) −113.7 m (18.4 Hz m), (f) −123.6 m, (g) −124.0 m, (h) −114.9 m, (i) 2.11 t/t, (j) 1.76 m, (k) 0.716 t, (l) −43.3, (m) 3.58 s.

Example 7. Preparation of CH$_2$═CHCH$_2$—O—C$_4$F$_8$—O—CH$_2$CH$_2$CH$_2$SiCl$_3$, AEC4EPTCS To a 600 mL stirred reactor, available from Parr Instrument Company, was charged 100 g (1.7 mol) KF, 12 g (0.04 mol) tetra-n-butylammonium bromide, and 250 g diglyme. The reactor was sealed and placed under 25 Torr of vacuum. To the reactor was charged 121 g (1.0 mol) allylbromide, available from TCI, and 70 g (0.36 mol) perfluorosuccinyl fluoride, after the reactor was cooled to 6° C. The contents of the reactor were stirred and heated to 75° C. for 20 h. The reactor was cooled to 25° C. and the contents were washed three times each with 400 g distilled water. Distillation of the lower fluorochemical phase gave 67 g (0.21 mol) octafluorobutane diallyl ether, CH$_2$═CHCH$_2$—O—C$_4$F$_8$—O—CH$_2$CH═CH$_2$, with a boiling point of 35° C. at 3 Torr for a 59% yield. Two additional runs were carried out and the products of the three runs were combined to yield a total of 200 g of octafluorobutane diallyl ether. In a 250 mL round bottom flask equipped with a stir bar was added 160 g (0.51 mol) octafluorobutane diallyl ether and 28 g (0.21 mol) of trichlorosilane, and 300 ppm platinum divinyl tetramethyl disiloxane complex. The contents were stirred and heated to 63° C. for 2 h. The solution was vacuum stripped to first remove excess octafluorobutane diallyl ether, resulting in isolation of 77 g (0.17 mol) of CH$_2$═CHCH$_2$—O—C$_4$F$_8$—O—CH$_2$CH$_2$CH$_2$SiCl$_3$, having a boiling point of 92° C. at 3 Torr for a 82% yield. NMR confirmed the compound.

Example 8. Preparation of CH$_2$═CHCH$_2$—O—C$_4$F$_8$—O—CH$_2$CH$_2$CH$_2$Si(OCH$_3$)$_3$, AEC4EPTMS To a 250 mL 3-neck, round bottom flask containing a magnetic stir bar, thermocouple and condenser was charged 20 g methanol. The methanol was stirred and 22 g (0.05 mol) of compound from example 7 was added dropwise. The reaction was stirred at 30° C. for 15 min and vacuum distillation isolated 18 g, (0.04 mol) of CH$_2$═CHCH$_2$—O—C$_4$F$_8$—O—CH$_2$CH$_2$CH$_2$Si(OCH$_3$)$_3$ having a boiling point of 82° C. at 3 Torr for an 86% yield. $^{19}$FNMR negative upfield of internal CFCl3, $^1$HNMR ppm downfield of internal TMS and $^{29}$SiNMR negative ppm upfield of internal TMS in CDCl$_3$. CH$^a$H$^b$═CH$^c$CH$_2$$^d$—O—CF$_2$$^e$CF$_2$$^f$CF$_2$$^g$CF$_2$$^h$—CH$_2$$^i$CH$_2$$^j$CH$_2$$^k$Si$^l$(OCH$_3$$^m$)$_3$, (a) 5.38 d/m (17.4 Hz d), (b) 5.28 d/m (10.6 Hz d, 5.7 Hz m), (c) 5.91 d/d/t (10.6 Hz d, 12.4 Hz d, 5.7 Hz t), (d) 4.5 d/m (5.7 Hz d), (e) −85.9 m, (f) −125.8 m, (g) −125.8 m, (h) −85.9 m, (i) 4.01 t (6.4 Hz t), (j) 1.82 m (6.4 Hz m), (k) 0.71 m, (l) −42.7, (m) 3.58 s.

Thus, embodiments of functional fluorinated silane compounds are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

The invention claimed is:

1. A compound according to formula I:

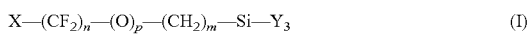

X—(CF$_2$)$_n$—(O)$_p$—(CH$_2$)$_m$—Si—Y$_3$ (I)

wherein X is CF$_2$═CF—O—, CH$_2$═CHCH$_2$—O—, or CH$_2$═CHCH$_2$—;
m is an integer from 2 to 5;
p is 0 and n is an integer from 2 to 4, or p is 1 and n is an integer from 2 to 8; and
Y is Cl— or —OR, where R is a linear or branched alkyl having 1 to 4 carbon atoms.

2. The compound according to claim 1, wherein X is CH$_2$═CHCH$_2$—.

3. The compound according to claim 2, wherein p is 1 and n is an integer from 2 to 7.

4. The compound according to claim 2, wherein m is an integer from 2 to 4.

5. The compound according to claim 1, wherein p is 1 and n is an integer from 2 to 7.

6. The compound according to claim 5, wherein n is an integer from 2 to 6.

7. The compound according to claim 6, wherein n is an integer from 2 to 4.

8. The compound according to claim 1, wherein m is an integer from 2 to 4.

9. The compound according to claim 8, wherein m is an integer from 2 to 3.

10. The compound according to claim 1, wherein Y is —O(CH$_2$)$_x$CH$_3$, wherein x is an integer from 0 to 3.

11. The compound according to claim 10, wherein x is 0.

12. The compound according to claim 10, wherein X is CH$_2$═CHCH$_2$—.

13. The compound of claim 12, wherein p is 1 and n is an integer from 2 to 7.

14. The compound according to claim 12, wherein m is an integer from 2 to 4.

15. The compound according to claim 1, wherein p=0.

16. The compound according to claim 15, wherein the compound is selected from the group consisting of:

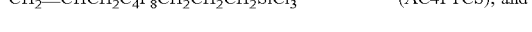

CH$_2$═CHCH$_2$C$_4$F$_8$CH$_2$CH$_2$CH$_2$SiCl$_3$ (AC4PTCS), and

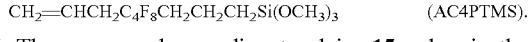

CH$_2$═CHCH$_2$C$_4$F$_8$CH$_2$CH$_2$CH$_2$Si(OCH$_3$)$_3$ (AC4PTMS).

17. The compound according to claim 15, wherein the compound is selected from the group consisting of:

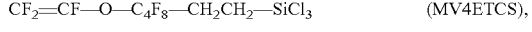

CF$_2$═CF—O—C$_4$F$_8$—CH$_2$CH$_2$—SiCl$_3$ (MV4ETCS),

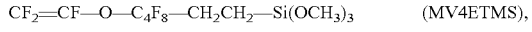

CF$_2$═CF—O—C$_4$F$_8$—CH$_2$CH$_2$—Si(OCH$_3$)$_3$ (MV4ETMS),

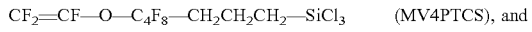

CF$_2$═CF—O—C$_4$F$_8$—CH$_2$CH$_2$CH$_2$—SiCl$_3$ (MV4PTCS), and

CF$_2$═CF—O—C$_4$F$_8$—CH$_2$CH$_2$CH$_2$—Si(OCH$_3$)$_3$ (MV4PTMS).

18. The compound according to claim 1, wherein p=1.

19. The compound according to claim 18, wherein the compound is selected from the group consisting of:

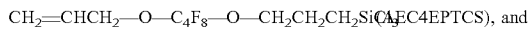

CH$_2$═CHCH$_2$—O—C$_4$F$_8$—O—CH$_2$CH$_2$CH$_2$SiCl$_3$ (AEC4EPTCS), and

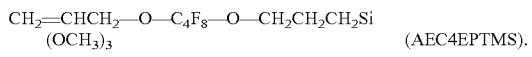

CH$_2$═CHCH$_2$—O—C$_4$F$_8$—O—CH$_2$CH$_2$CH$_2$Si(OCH$_3$)$_3$ (AEC4EPTMS).

* * * * *

UNITED STATES PATENT AND TRADEMARK OFFICE
CERTIFICATE OF CORRECTION

PATENT NO. : 11,059,839 B2
APPLICATION NO. : 16/957942
DATED : July 13, 2021
INVENTOR(S) : Mike Guerra Page 1 of 1

It is certified that error appears in the above-identified patent and that said Letters Patent is hereby corrected as shown below:

In the Specification

Column 6
Line 3, Delete "$^1$F NMR" and insert -- $^1$HNMR --, therefor.

In the Claims

Column 8
Line 57, Claim 14, delete
"$CH_2=CHCH_2—O—C_4F_8—O—CH_2CH_2CH_2SiCl_3(AEC4EPTCS)$," and insert
-- $CH_2=CHCH_2—O—C_4F_8—O—CH_2CH_2CH_2SiCl_3$ (AEC4EPTCS), --, therefor.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*